United States Patent Office 2,767,131
Patented Oct. 16, 1956

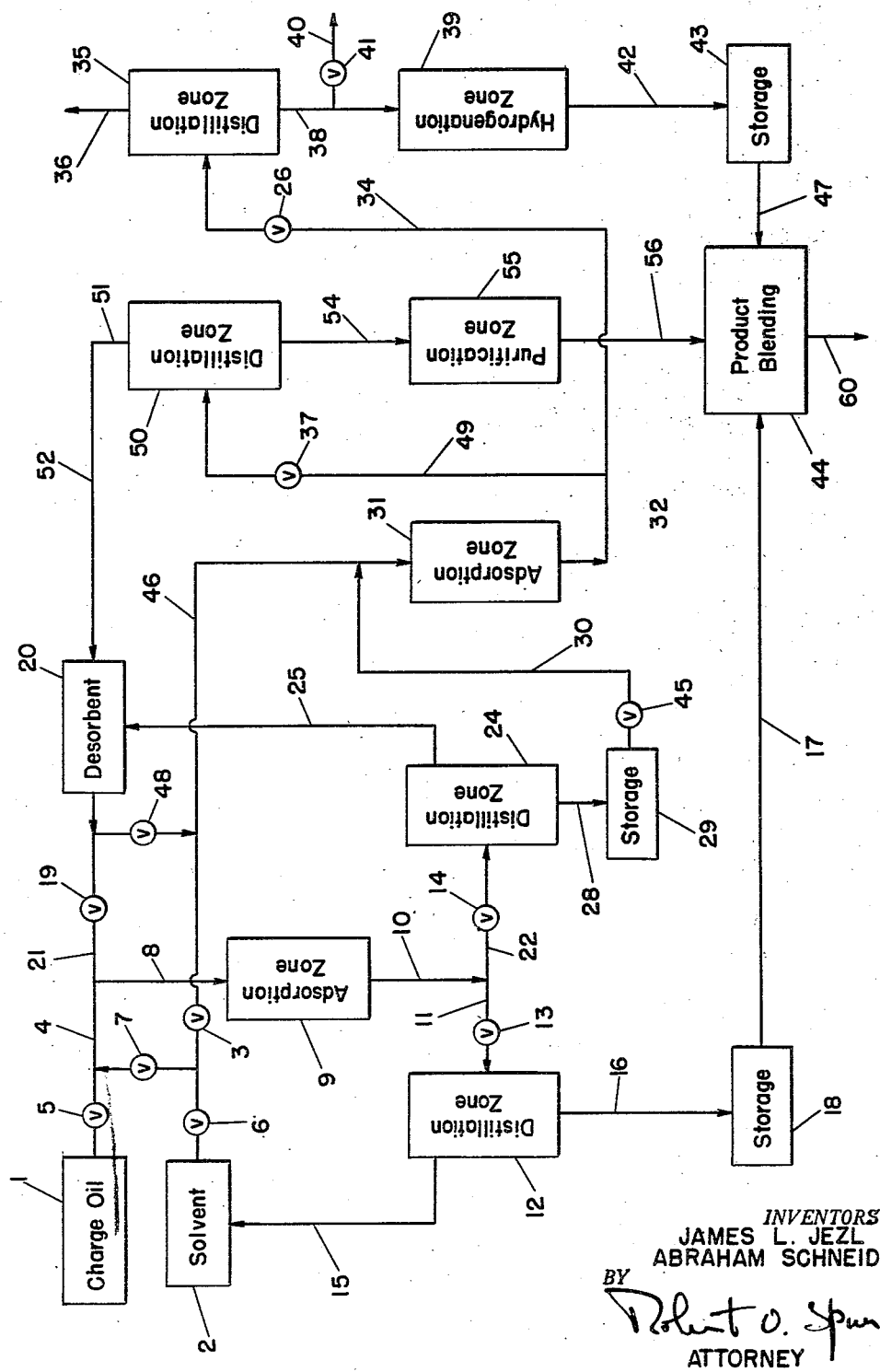

2,767,131

PRODUCTION OF OXIDATION RESISTANT LUBRICATING OILS

James L. Jezl, Swarthmore, and Abraham Schneider, Overbrook Hills, Pa., assignors to Sun Oil Company, Philadelphia, Pa., a corporation of New Jersey Application September 7, 1954, Serial No. 454,344

10 Claims. (Cl. 196—147)

This invention relates to a method of producing stable hydrocarbon oils. More particularly, the invention is directed to a method of producing hydrocarbon lubricating oils that are highly resistant to oxidation.

Lubricating oils have heretofore been contacted with adsorbents such as silica gel in order to separate the lubricating oil into fractions according to hydrocarbon types. The blending together of certain of the so-separated fractions, usually for the purpose of obtaining a high viscosity index oil, has been described. Such operation, however, frequently results in a highly unstable oil that is unsuitable for many purposes. Furthermore, one or more of the fractions separated by silica gel is not blended into the lubricating oil and are waste products of the process. Accordingly, such processes are not generally economically feasible.

It has now been found that by using an adsorbent, or a plurality of adsorbents, such as silica gel, activated alumina or activated carbon, to separate a lubricating oil into a fraction consisting predominantly of saturated hydrocarbons, a fraction consisting predominantly of mononuclear aromatic hydrocarbons and a fraction consisting predominantly of polynuclear aromatic hydrocarbons, subjecting the mono-nuclear aromatic hydrocarbon fraction to hydrogenation whereby the aromatics are substantially converted saturated hydrocarbons, and thereafter combining the saturate fraction obtained by hydrogenation with the saturate fraction separated by adsorption and the polynuclear aromatic fraction, a lubricating oil highly resistant through oxidation is obtained.

The accompanying drawing is a flow diagram used to illustrate the process of the invention and is described hereinafter.

In accordance with an embodiment of the invention, a hydrocarbon oil unstable toward oxidation is contacted with an adsorbent such as silica gel. Aromatic components of the charge oil are preferentially adsorbed on the adsorbent so that the effluent from the adsorption zone is a fraction consisting predominantly of saturate hydrocarbons, including both paraffins and naphthenes, i. e. there is obtained a fraction containing substantially all of the saturated hydrocarbons in the charge oil and substantially none of the aromatic hydrocarbons. The aromatic hydrocarbons adsorbed on the adsorbent are thereafter recovered by desorption. The recovered aromatic hydrocarbons are then contacted with an adsorbent such as silica gel or activated alumina. Polynuclear arocatics, i. e. aromatic hydrocarbons having at least two benzene rings that are fused, are preferentially adsorbed by the second adsorbent so that the effluent from the adsorption zone during the contacting consists predominantly of mononuclear aromatic hydrocarbons. The adsorbed polynuclear aromatic hydrocarbons are thereafter recovered from the adsorbent by desorption. The resulting polynuclear aromatic hydrocarbon fraction is blended with the saturate fraction separated by the initial adsorption step to prepare a stable oil product.

It is preferred, however, in accordance with the invention, to subject the mononuclear aromatic fraction from the second adsorption step to hydrogenation to convert the hydrocarbons therein to predominantly saturated hydrocarbons. The resulting saturates are then blended with the polynuclear aromatic hydrocarbon fraction and the saturate hydrocarbon fraction from the first adsorption. By such operation, substantially all of the hydrocarbons are employed and a product remarkably stable to oxidation is obtained. It has been further found that including the hydrogenated mononuclear aromatic fraction in the final product enhances the viscosity index of the oil product to a substantial extent. The hydrogenation is performed by conventional means, such as by using a hydrogenation catalyst such as a sulfide of nickel or molybdenum, a temperature of from 100° F. to 800° F., a pressure of from atmospheric to 10,000 p. s. i. g., and a space rate of from about 1 to 10.

If necessary or desirable, the recovered polynuclear aromatic hydrocarbons can be treated to remove non-hydrocarbons, i. e., compounds containing sulfur, nitrogen or oxygen. Such non-hydrocarbons, if present in the charge stock, are adsorbed to about the same degree as the polynuclear aromatics, and hence appear in the described polynuclear aromatic fraction. This treating may be conveniently accomplished by contacting the polynuclear aromatic fraction with clay, or by extracting with hydrogen fluoride or sulfuric acid. If desired, the initial charge oil may be treated to remove non-hydrocarbons, in which case such treatment after separation of the polynuclear aromatics is unnecessary.

Silica gel is the preferred adsorbent to employ, but other solid adsorbents effective for separating hydrocarbons according to type, such as activated alumina and activated carbon, can be employed in either or both of the described adsorption steps. Silica gel of from about 10 to 300 mesh, say from about 28 to 100 mesh, gives good results. The temperature of contacting hydrocarbons with the adsorbent is not critical but will usually be within the range of from about 50° F. to 300° F. Ambient temperature is suitable in most instances, but somewhat elevated temperatures are advantageous to reduce the viscosity of some charge stocks.

Attention is now directed to the accompanying flow diagram illustrating the process of the invention. Numeral 1 indicates a charge tank containing a hydrocarbon oil boiling within the lubricating oil range for use in the process. The lubricating oil may have been subjected to dewaxing, deasphaltizing, or otherwise treated prior to use in the present process. In the event the viscosity of the charge oil is too high for ready contacting with a solid adsorbent, a solvent from charge tank 2 is preferably blended therewith. The solvent may be paraffinic, naphthenic, or mixtures thereof. Butane, pentanes, hexanes, and the like, and mixtures thereof give good results, as do cyclohexane, methylcyclohexane, and the like, and mixtures thereof with each other and with paraffins. Charge oil from tank 1 flows through line 4 on opening valve 5. Solvent is added to line 4 by opening valves 6 and 7, valve 3 being closed. A charge mixing tank (not shown) can be supplied if desired. The mixture of oil and solvent flows through line 8, valve 19 being closed, and contacts silica gel in adsorption zone 9. Since the affinity of silica gel for aromatic hydrocarbons is considerably greater than for saturates, there is obtained through line 10, during the contacting, a fraction consisting predominantly of saturated hydrocarbons. This saturate fraction flows through line 11 into distillation zone 12, valve 13 being open and valve 14 being closed. In distillation zone 12, solvent is separated and returned to charge tank 2 through line 15, and saturates are removed through line 16 and passed to storage vessel 18, the storage vessel being supplied for convenience. From storage vessel 18 the saturates are passed through line 17 to product blending tank 44. Before or shortly after the ability of the silica gel to preferentially adsorb aromatic hydrocarbons has been depleted so that aromatics appear in line 10, the operation is discontinued by closing valves 5, 6, 7 and 13. Aromatic hydrocarbons adsorbed on the silica gel are recovered by opening valve 19 so that a desorbent passes from charge tank 20 through lines 21 and 8, valve 48 being closed. Low boiling aromatic hydrocarbons are preferred desorbents, such as benzene, toluene, xylene, and mixtures thereof, but other compounds, particularly highly polar compounds such as ethylene dichloride, either alone or admixed with an aromatic desorbent, give good results. On passing desorbent through adsorption zone 9, a mixture of aromatic hydrocarbons and desorbent flows through lines 10 and 22 to distillation zone 24, valve 14 being open for this operation. In distillation zone 24 the desorbent and aromatic hydrocarbons are separated, the desorbent being passed through line 25 to charge tank 20. The aromatic hydrocarbons are removed from distillation zone 24 through line 28 and are passed to storage vessel 29, the storage vessel being supplied for convenience. Aromatic hydrocarbons are removed from storage vessel 29 through open valve 45 and line 30, and are passed into second adsorption zone 31 containing an adsorbent effective for separating mononuclear aromatic hydrocarbons from polynuclear aromatic hydrocarbons, such as activated alumina. It is preferred to admix solvent with the aromatic fraction to reduce the viscosity thereof. This can be accomplished by passing solvent from tank 2 through line 46, valves 6 and 3 being open and valves 7 and 48 being closed. Since the adsorbent employed in zone 31 preferentially adsorbs polynuclear aromatics, a mixture of a hydrocarbon fraction consisting predominantly of mononuclear aromatics and solvent passes through lines 32 and 34 to distillation zone 35, valves 26 and 45 being open and valve 37 being closed. In distillation zone 35 any solvent or desorbent which may have passed through the various operations together with the mononuclear aromatics is removed through line 36 and may be recycled to the appropriate charge tank. The mononuclear aromatic fraction passes through line 38 to hydrogenation zone 39. If desired, a portion of the mononuclear aromatic fraction may be removed from the process through line 40 by operating valve 41. In hydrogenation zone 39, the mononuclear aromatics are converted to predominantly saturated hydrocarbons and are then passed through line 42 to storage tank 43, provided for convenience, and thereafter through line 47 to product blending tank 44.

When the activity of the desorbent in adsorption tower 31 toward separating mononuclear from polynuclear aromatic hydrocarbons has been substantially depleted, the operation is stopped by closing valves 45 and 3. Desorbent, which is preferably the same desorbent employed in desorbing first adsorption zone 9 is introduced from tank 20 through line 46 into adsorption zone 31 by opening valve 48. A mixture of desorbent and polynuclear aromatics flows through line 32 and is passed through line 49 into distillation zone 50, valve 37 being open and valve 26 being closed. In distillation zone 50, desorbent is removed and returned to charge tank 20 through lines 51 and 52. The polynuclear aromatics are passed through line 54 to purification zone 55, where non-aromatic compounds are removed; unless necessary purification zone 55 can be omitted as above described. From purification zone 55 the polynuclear aromatics pass through line 56 to product blending tank 44. If desired, adequate storage (not shown) can be provided prior to blending.

It is desirable in some instances to include only a portion of the polynuclear aromatics, and preferably the polynuclear aromatics boiling within specific ranges as hereinafter disclosed, and such a fraction can be supplied directly from distillation zone 50, or further means (not shown) can be employed.

In product blending tank 44, the three fractions, prepared and treated as above described, are blended to prepare the final stable hydrocarbon oil which is recovered through line 60.

The foregoing description is of a preferred embodiment of the invention. A further embodiment is to operate the first adsorption zone so that substantially only polynuclear aromatics are adsorbed, this effecting separation of a saturate-mononuclear aromatic fraction and a polynuclear aromatic fraction. The separated fraction containing saturated hydrocarbons, including naphthenes, and mononuclear aromatic hydrocarbons is then subjected to hydrogenation. The hydrocarbon product from the hydrogenation, consisting substantially of saturated hydrocarbons, is then blended with the polynuclear aromatic fraction.

A further embodiment of the invention that can be employed with good results is the operation of the second adsorption zone so that the dinuclear aromatics, i. e., naphthalenes, remained in the fraction with the mononuclear aromatics and are subsequently hydrogenated therewith. It has been found advantageous in some instances to so convert the naphthalenes to saturated hydrocarbons, together with the mononuclear aromatics, and to subsequently blend the hydrogenated product with the polynuclear aromatic fraction, which in this embodiment consists principally of trinuclear aromatic hydrocarbons, and the saturate fraction as above described.

Other embodiments within the scope of the invention will be apparent to those skilled in the art, such as the use of a single silica gel column to effect separation of the desired three fractions. This can be accomplished, for example, by first separating a saturate fraction, and then employing a desorbent to selectively desorb from silica gel containing adsorbed mono- and polynuclear aromatic hydrocarbons a fraction consisting predominantly of mononuclear aromatic hydrocarbons, and then desorbing the polynuclear aromatic hydrocarbons. A desorbent effective for such a separation, for example, is a solution containing about 24% benzene in pentane.

The following example illustrates the process of the invention, in which "parts" refers to parts by weight.

To 18.3 parts of a petroleum hydrocarbon fraction boiling in the lubricating oil range was added 26.2 parts of pentane. The resulting admixture was contacted with 167 parts silica gel of 28–100 mesh in an adsorption column. A fraction, 9.3 parts, consisting predominantly of saturated hydrocarbons was separated, an additional quantity of pentane being passed through the column to assist the recovery. Continuing the separation by silica gel, there were recovered 5.1 parts of a fraction consisting predominantly of mononuclear aromatic hydrocarbons, 2.33 parts of a fraction consisting predominantly of dinuclear aromatic hydrocarbons, and 1 part of a fraction consisting predominantly of trinuclear, and higher, condensed aromatic hydrocarbons. There were also obtained a small quantity, about 0.57 part, of a fraction consisting principally of resins and non-hydrocarbons.

In accordance with the invention as above described, it is not necessary to separate the dinuclear aromatic hydrocarbons as a separate fraction, the separation being here made to fully illustrate the process.

Various quantities of the several fractions were blended and tested for oxidation stability; individual fractions and the initial oil were tested for comparison. The tests were performed by contacting, at 280° F., the sample being tested with oxygen and recording the time in hours required for the oxidation of the sample to reach a set value. The following results were obtained, in which the fraction consisting predominantly of saturated hydrocarbons is designated "A," of mononuclear aromatics "B," and of trinuclear and higher condensed aromatics "C."

| Run No. | Fraction | Ratio | Hours |
|---|---|---|---|
| 1 | A | | 0.60 |
| 2 | B | | 0.80 |
| 3 | C | | 1.6 |
| 4 | A+C | 99:1 | 2.3 |
| 5 | A+C | 98:2 | 3.3 |
| 6 | A+C | 95:5 | 6.7 |
| 7 | A+C | 90:10 | 7.2 |
| 8 | A+C | 80:20 | 6.4 |
| 9 | A+C | 50:50 | 5.6 |
| 10 | A+B+C | 50:40:10 | 1.4 |
| 11 | Initial Oil | | 3.7 |

These data show the relative instability toward oxidation of the original oil and fractions obtained therefrom by separation according to hydrocarbon type as compared to the remarkable stability of blends of the saturate hydrocarbon fraction with the polynuclear aromatic fraction. The deleterious effect of mononuclear aromatics is shown by run No. 10. On hydrogenation of the mononuclear aromatic fraction to convert the aromatic hydrocarbons to substantially saturated hydrocarbons, and blending the resulting saturates into the oil product, results substantially equivalent to those obtained by blending fractions A and C are obtained.

It will be noted that the above table shows the optimum ratio of saturates:polynuclear aromatics to be from about 98:2 to about 50:50, and it is preferred to blend the several fractions, including the saturate fraction obtained by the hydrogenation of mononuclear aromatics, to obtain a blend within this range. The composition of many lubricating oils are such that the entire quantity of each fraction is blended to prepare the final stable product.

The invention claimed is:

1. A method of producing a highly stable lubricating oil which comprises separating by adsorption on a solid adsorbent a lubricating oil into (A) a fraction consisting predominantly of saturated hydrocarbons, (B) a fraction consisting predominantly of mononuclear aromatic hydrocarbons, and (C) a fraction consisting predominantly of polynuclear aromatic hydrocarbons, hydrogenating fraction (B) to produce a fraction (D) consisting predominantly of saturated hydrocarbons, and blending fractions (A), (C) and (D) in a ratio of saturated hydrocarbons to polynuclear aromatic hydrocarbons of from about 95:5 to 50:50 to produce a highly stable lubricating oil.

2. A method according to claim 1 wherein said solid adsorbent is silica gel.

3. A method according to claim 1 wherein said solid adsorbent is activated alumina.

4. A method according to claim 1 wherein said solid adsorbent is activated carbon.

5. A method of producing a highly stable lubricating oil which comprises separating by adsorption on silica gel a lubricating oil into (A) a fraction consisting predominantly of saturated hydrocarbons and (B) a fraction consisting predominantly of aromatic hydrocarbons, separating fraction (B) by adsorption on a second solid adsorbent into (C) a fraction consisting predominantly of mononuclear aromatic hydrocarbons and (D) a fraction consisting predominantly of polynuclear aromatic hydrocarbons, hydrogenating fraction (C) to produce a fraction (E) consisting predominantly of saturated hydrocarbons, and blending fractions (A), (D) and (E) in a ratio of saturated hydrocarbons to polynuclear aromatic hydrocarbons of from about 95:5 to 50:50 to produce a highly stable lubricating oil.

6. A method according to claim 5 wherein said second solid adsorbent is silica gel.

7. A method according to claim 5 wherein said second solid adsorbent is activated carbon.

8. A method according to claim 5 wherein said second adsorbent is activated carbon.

9. A method of producing a highly stable lubricating oil which comprises separating by adsorption on silica gel a lubricating oil into (A) a fraction containing substantially all of the saturated hydrocarbons and the mononuclear aromatic hydrocarbons of the charge oil and (B) a fraction containing substantially all of the polynuclear aromatic hydrocarbons of the charge oil, hydrogenating fraction (A) to convert substantially all of the mononuclear aromatic hydrocarbons to saturated hydrocarbons, and blending the hydrogenated fraction with fraction (B) in a ratio of said hydrogenated fraction to said fraction (B) of from about 95:5 to 50:50 to produce a highly stable lubricating oil.

10. A method of producing a highly stable lubricating oil which comprises separating by adsorption on silica gel a lubricating oil into (A) a fraction consisting predominantly of saturated hydrocarbons, (B) a fraction consisting predominantly of mononuclear and dinuclear aromatic hydrocarbons, and (C) a fraction consisting predominantly of trinuclear and more highly condensed aromatic hydrocarbons, hydrogenating fraction (B) to obtain a fraction (D) consisting predominantly of saturated hydrocarbons, and blending fractions (A), (C) and (D) in a ratio of saturated hydrocarbons to polynuclear aromatic hydrocarbons of from about 95:5 to 50:50 to obtain a highly stable lubricating oil.

References Cited in the file of this patent

UNITED STATES PATENTS

| 2,191,089 | Barth | Feb. 20, 1940 |
| 2,195,659 | Shoemaker | Apr. 20, 1940 |
| 2,304,289 | Tongberg | Dec. 8, 1942 |
| 2,643,217 | Watson et al. | June 23, 1953 |

OTHER REFERENCES

Mair et al.: J. Research Nat'l Bur. Stand., vol. 21 (1938), pages 581 and 601.